United States Patent [19]

Wicks

[11] Patent Number: 4,987,979
[45] Date of Patent: Jan. 29, 1991

[54] ANTI-SQUEAK BUMPERS FOR BRAKES
[75] Inventor: Thomas Wicks, Chelsea, Mich.
[73] Assignee: Chrysler Corporation, Highland Park, Mich.
[21] Appl. No.: 474,892
[22] Filed: Feb. 5, 1990
[51] Int. Cl.5 ............................................. F16D 69/00
[52] U.S. Cl. ................................ 188/250 E; 188/250 C; 188/340
[58] Field of Search ............ 188/250 E, 250 A, 250 C, 188/250 R, 250 G, 250 B, 340, 341, 335, 205 R, 205 A, 206 R, 206 A, 218 R, 218 A

[56] References Cited

U.S. PATENT DOCUMENTS

| | | | |
|---|---|---|---|
| 1,908,410 | 5/1933 | Dodge | 188/340 X |
| 2,111,297 | 3/1938 | Pontius, Jr. | 188/340 |
| 3,548,976 | 12/1970 | Dombeck | 188/340 |
| 3,795,292 | 3/1974 | Keller, Jr. | 188/340 |
| 3,998,303 | 12/1976 | Wunderlich | 188/340 |
| 4,361,214 | 11/1982 | Roberts | 188/335 |
| 4,790,704 | 12/1988 | Temple et al. | 188/340 X |
| 4,869,352 | 9/1989 | Sampson | 188/340 |

Primary Examiner—Douglas C. Butler
Attorney, Agent, or Firm—Edward A. Craig

[57] ABSTRACT

A spacer (10) is used to prevent a vibratory noise created by two inelastic parts of a drum brake assembly (12) from contacting each other; the two inelastic parts being the backing plate (18) and the brake shoe (28). The spacer (10) is fabricated from an organic polymeric material based on acetal. The spacer (10) comprises a head (30) and an anchor (34). The head (30) is cylindrical in shape with a rounded distal end (32). The rounded distal end (32) is the end that contacts the backing plate (18) and absorbs any vibratory energy which may produce a noise if the vibratory energy contacted an inelastic object, i.e., the brake shoe (28). The anchor (34) is extended through a hole in the tab (26) and is secured thereto because the fluted edges (36) of the anchor (34) are forced through the hole (not shown) in the tab (26).

7 Claims, 1 Drawing Sheet

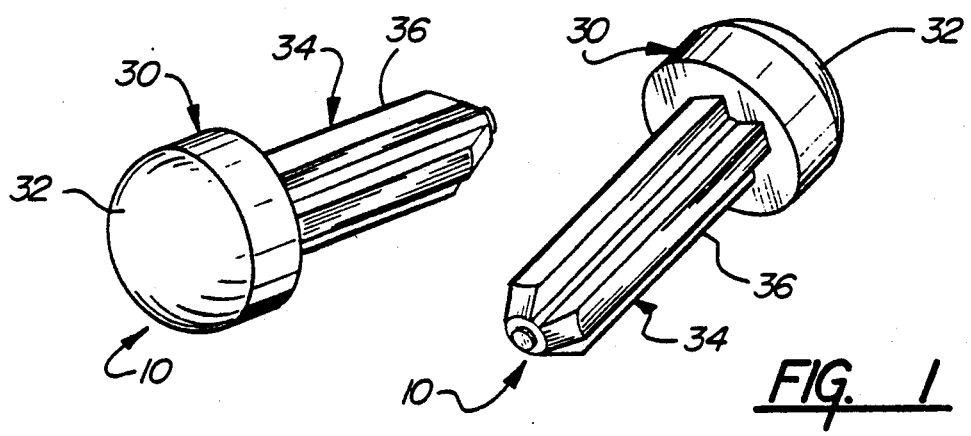
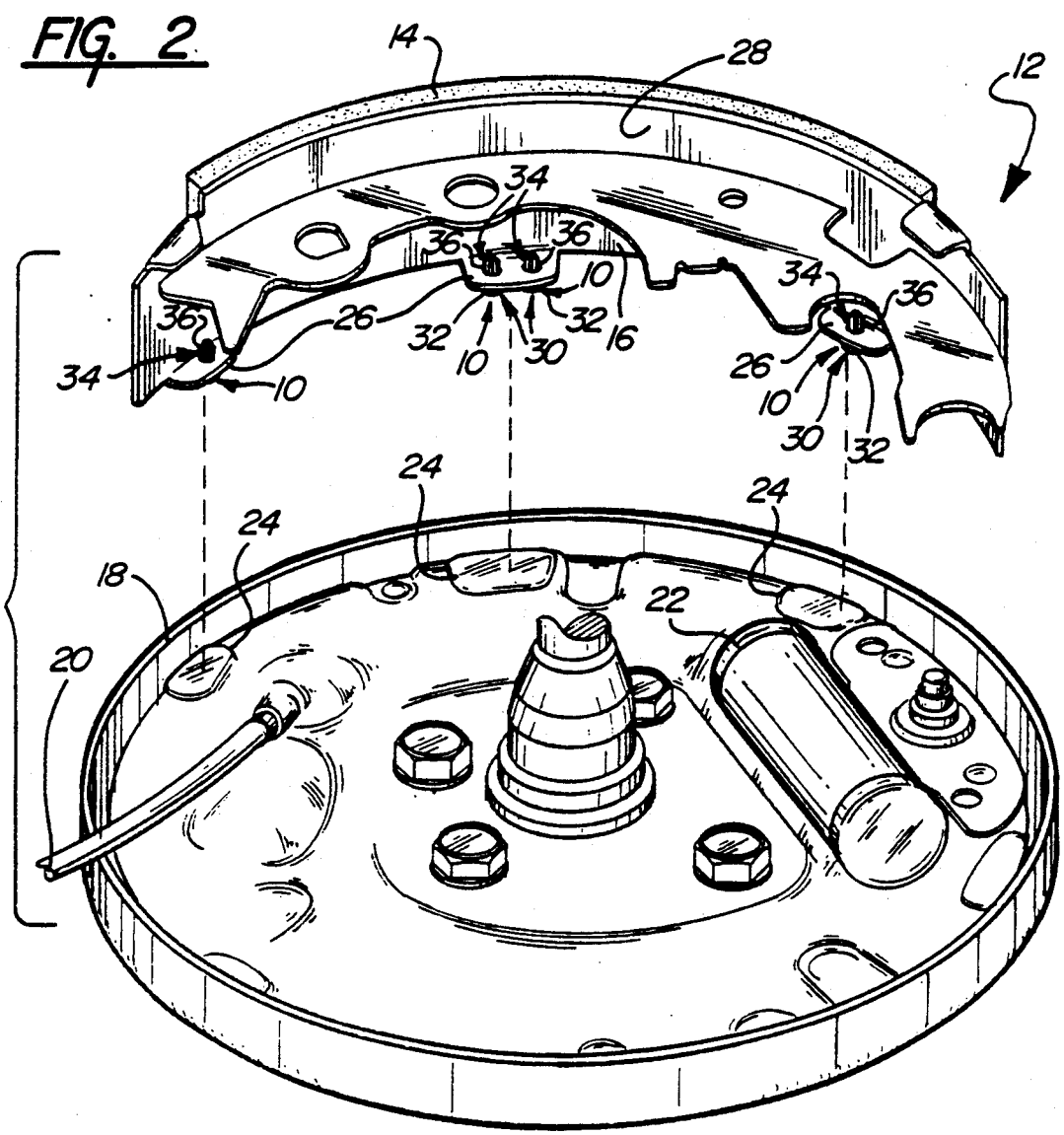

ANTI-SQUEAK BUMPERS FOR BRAKES

BACKGROUND OF THE INVENTION

1. Field of the Invention

This invention relates to vibration absorbing spacers and vehicular braking systems. More particularly, this invention relates to elastic spacers used to absorb the vibrations of the brake system that cause the high pitched noise.

2. Description of the Prior Art

When a vehicular braking system produces a high pitched vibrational sound, or squeak, it is because of two (2) or more parts made of inelastic material are contacting each other while these parts are vibrating. The backing plate is one such part. Since the backing plate's main function is to keep all the parts of the brake systems spacially related with each other, it necessarily follows that the backing plate must physically contact the various brake parts. Often times, it is the brake shoe and the backing plate that come into vibratory contact resulting in the high pitched vibratory noise.

Several attempts have been made to eliminate the vibrational contact between the backing plate and the brake shoe by providing an elastic barrier between the two. The contacting parts have been coated with the elastic materials to produce the barrier. Grease and Teflon are two elastic materials which have been used in the past. These have proven ineffective due to the short life these materials have in this environment. The grease and Teflon both wear away rapidly when dirt or other debris comes between the contact surfaces. As a consequence, many annoyingly minor trips to the service station are required.

SUMMARY OF THE INVENTION

The subject invention is a vehicle drum brake assembly. It is used to selectively applying pressure to rotating drum to stop the vehicle. The assembly comprises a rotating drum for receiving a braking force. It also comprises a lining means for frictionally engaging the rotating drum means. The brake shoe means supports the lining means and is moveably supported by backing plate means. The backing plate means includes a platform means for properly spacing the brake shoe means from the backing plate means. The tab means is fixedly attached to the brake shoe means for engaging the platform means. The subject invention is characterized by spacer means disposed between the tab means and the platform means for reducing the vibrational noise.

The subject invention overcomes the above mentioned deficiency by placing an elastic structure, the spacing means, in between the platform means and the tab means. The spacing means is better suited to absorb the vibrations and is impervious to the dirty, vibrating environment in which it is being placed; therefore, it lasts longer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the preferred embodiment of the subject invention shown twice in opposing orientation; and FIG. 2 is an exploded perspective view of a typical drum brake with the preferred embodiment of the subject invention inserted in the tab means.

DETAILED DESCRIPTION OF THE DRAWINGS

The subject invention is a spacer means and is generally shown at 10 in FIGS. 1 and 2. The spacer means 10 is to be used inside a vehicle drum brake assembly, generally shown at 12. The vehicle drum brake assembly 12 comprises a rotating drum means (not shown) which is used to create the braking force to stop the vehicle (not shown). A lining means 14 is used for frictionally engaging the rotating drum means. The lining means 14 is supported by the brake shoe means 16. The lining means 14 is fixedly secured to the brake shoe means 16.

The backing plate means 18 moveably supports the brake shoe means 16 and other such components, i.e., the parking brake cable 20 and the wheel cylinder 22, neither of which is the subject of this invention. The backing plate means 18 includes the platform means 24, three of which are shown in FIG. 2, which enables the brake shoe means 16 to be properly spaced from the backing plate means 18.

The tab means 26 are fixedly attached to the brake shoe means 16 and are used for engaging the platform means 24. The tab means 26, as shown in FIG. 2, are flanges extending substantially perpendicular to the main face 28 of the brake shoe means 16.

The spacer means 10 are disposed between the tab means 26 and the platform means 24 to reduce the vibrational noise. Since the purpose of the spacer means 10 is to provide a space between the tab means 26 and the platform means 24, the spacer means 10 must be rigid enough to withstand the vibrational, dirty, harsh environment and still be elastic enough to absorb any vibration that will produce the noise. A material perfectly suited for such an environment is an organic polymeric material. A polyoxynethylene based on acetal, was found to be the material well suited for such an environment.

The spacer means 10 includes a head means 30 which is used to contact the platform means 24. The head means 30 has a circular cross section and is cylindrical in shape. The head means 30 includes a contact means 32 which is used to directly contact the platform means 24. The contact means 32 has a rounded distal end.

The spacer means 10 further includes an anchor means 34 which is to be received by the tab means 26. The anchor means 34 has the function of keeping the spacer means 10 between the tab means 26 and the platform means 24. One hole (not shown) is drilled through the tab means 26 for each spacer means 10 used. The anchor means 34 is then inserted into the hole of the tab means 26. To insure that the anchor means 34 will remain in the hole of the tab means 26, the edges of the anchor means 34 are fluted 36. The fluted edges 36 of the anchor means 34 define a cross as viewed in the cross section of the spacer means 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle drum brake assembly (12) for selectively applying pressure to a rotating drum, said assembly comprising:

rotating drum means for receiving a braking force to stop the vehicle;

lining means (14) for frictionally engaging said rotating drum means;

brake shoe means (16) supporting said lining means (14), the brake shoe means having a main face (28) on the side opposite said lining means (14) upon which a brake shoe web is supported centrally thereof;

backing plate means (18) for moveably supporting said brake shoe means (16);

said backing plate means (18) including platform means (24) for properly spacing said brake shoe means (16) from said backing plate means (18);

tab means (26) fixedly attached to said brake shoe means (16) along an edge thereof spaced from said web and substantially perpendicular to the main face (28) for engaging said platform means (24), said assembly characterized by spacer means (10) secured to the tab means (26) and disposed between said tab means (26) and said platform means (24), the spacer means (10) including head means (30) secured to the tab means (26) on a side thereof remote from the web to extend into contact with the platform means (24), the spacer means (10) including anchor means (34) extending from the head means (30) received by said tab means (26) for securement thereto, the spacer means (10) being fabricated of an organic polymeric material to reduce vibrational noise.

2. An assembly as set forth in claim 1 further characterized by said head means (30) having a circular cross section.

3. An assembly as set forth in claim 2 further characterized by said head means (30) being cylindrical in shape.

4. An assembly as set forth in claim 3 further characterized by said head means (30) having contact means (32) for contacting said platform means (24).

5. An assembly as set forth in claim 4 further characterized by said contact means (32) having a rounded distal end.

6. An assembly as set forth in claim 1 further characterized by said anchor means (34) having fluted edges (36) for fixedly securing said spacer means (10) to said tab means (26).

7. An assembly as set forth in claim 6 further characterized by said fluted edges (36) defining a cross as viewed in cross section.

* * * * *